(12) United States Patent
Sethuraman et al.

(10) Patent No.: US 12,441,191 B1
(45) Date of Patent: Oct. 14, 2025

(54) POWERTRAIN FOR AN AGRICULTURAL TRACTOR WITH DUAL DRIVE AND DUAL INDEPENDENT OUTPUT ELECTRICAL MACHINE

(71) Applicant: TRACTORS AND FARM EQUIPMENT LIMITED, Tamil Nadu (IN)

(72) Inventors: Sriraman Sethuraman, Tamil Nadu (IN); Ravindran Vijayakumar, Tamil Nadu (IN); Manikandan Subramanian, Tamil Nadu (IN)

(73) Assignee: TRACTORS AND FARM EQUIPMENT LIMITED, Tamil Nadu (IN)

( * ) Notice: Subject to any disclaimer, the term of this patent is extended or adjusted under 35 U.S.C. 154(b) by 0 days.

(21) Appl. No.: 18/829,760

(22) Filed: Sep. 10, 2024

(30) Foreign Application Priority Data

Jun. 13, 2024 (IN) .............................. 202441045698

(51) Int. Cl.
| | |
|---|---|
| *B60L 1/00* | (2006.01) |
| *A01B 76/00* | (2006.01) |
| *B60K 6/442* | (2007.10) |
| *B60K 17/28* | (2006.01) |
| *B60K 25/00* | (2006.01) |
| *B60L 50/60* | (2019.01) |
| *B60L 50/70* | (2019.01) |
| *B62D 49/06* | (2006.01) |

(52) U.S. Cl.
CPC ................ *B60L 1/00* (2013.01); *A01B 76/00* (2013.01); *B60K 6/442* (2013.01); *B60K 17/28* (2013.01); *B60K 25/00* (2013.01); *B60L 1/003* (2013.01); *B60L 50/60* (2019.02); *B60L 50/70* (2019.02); *B60K 2025/005* (2013.01); *B60L 2200/40* (2013.01); *B62D 49/06* (2013.01)

(58) Field of Classification Search
CPC .. B60L 1/00; B60L 1/003; B60L 50/60; B60L 50/70; B60L 2200/40; A01B 76/00; B60K 6/442; B60K 17/28; B60K 25/00; B60K 2025/005; B62D 49/06
See application file for complete search history.

(56) References Cited

U.S. PATENT DOCUMENTS

2008/0254936 A1* 10/2008 Yang ........................ B60K 1/02
477/5

FOREIGN PATENT DOCUMENTS

| CN | 108146212 A | * | 6/2018 | ............. B60K 1/02 |
| CN | 108909425 A | * | 11/2018 | |
| CN | 111775722 A | * | 10/2020 | ......... B60L 15/2054 |
| EP | 1547840 A2 | * | 6/2005 | ............... B60K 6/36 |
| EP | 4331885 A1 | * | 3/2024 | ............... B60K 6/20 |
| KR | 101791690 B1 | * | 11/2017 | |
| WO | WO-2020074340 A1 | * | 4/2020 | ............. B60K 1/02 |

* cited by examiner

*Primary Examiner* — Drew J Brown
(74) *Attorney, Agent, or Firm* — Procopio, Cory, Hargreaves & Savitch LLP

(57) ABSTRACT

The present invention discloses a powertrain for an agricultural tractor, with dual drive and dual independent electrical output. It comprises two or more output drive shafts (105, 107) coupled to two or more loads a single power source (113) connected to multiple loads (101,103,104), by the first solid shaft (105) connecting machine 1 to a load 1 (101) on one end through a coupling device (106) and optionally to a prime mover (109) on the front end through a coupling unit (110).

27 Claims, 3 Drawing Sheets

POWERTRAIN FOR AN AGRICULTURAL TRACTOR WITH DUAL DRIVE AND DUAL INDEPENDENT OUTPUT ELECTRICAL MACHINE

CROSS REFERENCE TO RELATED APPLICATIONS

This application claims priority to Indian Patent Application No. 202441045698, filed Jun. 13, 2024, the contents of which are incorporated herein by reference in its entirety for all purposes.

FIELD OF INVENTION

The present invention relates to the field of agricultural implements. Specifically, the present invention relates to a powertrain for an agricultural tractor. Additionally, the invention relates to a method of working of the Powertrain for an agricultural tractor.

BACKGROUND OF THE INVENTION

The trend toward designing and building fuel-efficient, low-emission vehicles has indeed gained significant momentum over the past decade. At the forefront of this movement are hybrid vehicles, which seamlessly integrate a relatively efficient combustion engine with an electric drive motor. The vehicles have both electric power source and an IC engine. Efficiency in hybrid vehicles for adaptation to multiple loads is yet to be explored. Inventions where multiple loads are independently managed without load on any one mechanical or electrical part of the Tractors.

JP2012178971A provides a dual-drive electric machine which reduces power loss occurring in releasing between an output/input end and a load in a conventional rotary electric machine. The dual-drive electric machine is combined with an epicycle gear set (EG101). A clutch device is constructed with a controllable brake device. Through controlling the controllable brake device to perform brake locking or releasing, a rotation shaft (S101) at an output/input end, a rotation shaft (S102) at an output/input end and a sleeve rotation shaft (AS101) at an output/input end of the epicycle gear set (EG101) are operated to connect or release drives, and operations between the dual-drive electric machine (EM100) and the output/input ends are performed.

CN109130820A provides a double-drive motor with two-terminal independent output for electric vehicles. The double-drive motor includes an upper motor housing, a lower motor housing, and left and right motors. The upper motor housing and a lower motor housing can be detachably installed to form a fixed drive axle housing, the left motor includes a left motor stator and a left motor rotor, the right motor includes a right motor stator and a right motor rotor, the left motor stator and the right motor stator are fixedly installed on two sides of the drive axle housing respectively. The rotating shaft of the left motor rotor is directly connected with the left wheel, the rotating shaft of the right motor rotor is directly connected with the right wheel, the rotating shaft of the left motor rotor, and a bearing sleeve is arranged between the rotating shaft of the right motor rotor and the drive axle housing, and the exterior of the drive axle housing is connected with the vehicle frame through a left suspension connecting piece and a right suspension connecting piece. The double-drive motor has simple structure and high reliability, and the drive axle and the drive motor are integrated into one body, thereby saving space, lightening self-weight and facilitating modular design of the electric vehicle.

CN111775722A discloses a double-motor-driven multi-planet-row power coupling device of an electric tractor. The combination of three planetary gear mechanisms and a synchronizer gear shifting mechanism is used as the power coupling device of a driving motor and a PTO motor. Particularly, various working modes including dual-motor independent driving, dual-motor coupling driving running and dual-motor coupling driving rotary tillage can be realized through left-right engagement and disengagement of the synchronizer and locking and unlocking of a first brake and a second brake. And the application of various operation working conditions such as low-speed light load, low-speed heavy load and high-speed transportation of the tractor is met. Therefore, the adaptability of the electric tractor to the environment is improved, and the utilization rate of the motor is increased.

Accordingly, there is a need for a powertrain that combines dual drive with dual independent output from multiple machines to overcome the drawbacks in the existing vehicles.

OBJECT OF THE INVENTION

It is an object of the present invention to provide a power train capable of practical utilization in an agricultural tractor.

It is an object of this invention to provide a power train for a tractor that is more compact and easier to manufacture than hitherto known in the art.

It is another object of the present invention to provide a powertrain for a tractor that integrates multiple machines and operating implements to reduce the packing constraint.

It is yet another object of the present invention to provide a powertrain wherein multiple loads run independently and at different speed.

It is yet another object of the present invention to provide a powertrain provided with combined power flow from a common power train.

SUMMARY OF THE INVENTION

It is a principal aspect of the present invention to provide a powertrain for an agricultural tractor, comprising:
  power source (107), for providing a rotational power;
  an input shaft coupled to the power source for receiving the rotational power;
  two or more output drive shafts coupled to two or more loads selected from a first load (101) and a second load (102), and
  a controller;
  wherein the powertrain connects to multiple loads (101, 102) through a single energy source, by the first shaft, a solid shaft connecting machine 1 to the load 1, and a second hollow shaft connecting machine 2 to the load 2, the machines are electric machines functioning as both motor and generators and configured to operate at different speed and independent of each other and load 1 and load 2 are configured to be operated independently by the drive shafts.

It is another aspect of the present invention to provide a powertrain for an agricultural tractor, comprising:
  power source (113), for providing a rotational power;
  an input shaft coupled to the power source for receiving the rotational power;

two or more output drive shafts (105, 107) coupled to two or more loads (101, 103 and 102), selected from a first two or more machines comprising a first machine (109), a second machine (111); and a controller, wherein the powertrain connects to multiple loads (101, 103) through a single energy source (113), by the first solid shaft (105) connecting machine 1 to a load 3 (104) on one end and through a coupling device (106) on another end to a load 1, the solid shaft configured to pass through the front and the rear end of machine 1, a second hollow shaft connecting machine 2 to the load 2, the machines are electric machines functioning as both motor and generators and configured to operate at different speed and independent of each other, load 3 and load 2 are is connected to and load 1 is detachable and machine 1 configured to run load 1 and 3 simultaneously and load 2 are configured to be operated independently by the drive shafts.

It is yet another aspect of the present invention to provide a powertrain for an agricultural tractor, comprising:

power source (113), for providing a rotational power;

an input shaft coupled to the power source (113) for receiving the rotational power;

two or more output drive shafts (105, 107) coupled to two or more loads comprising a first load (101), a second load (103), a third load (104), and a controller, wherein the powertrain comprises a single power source (113) connected to multiple loads (101,102,103), by the first solid shaft (105) connecting machine 1 to a load 3 (104) on one end and through a coupling device (106) on another end to a load 1, a second hollow shaft connecting machine 2 to the load 2, the machines are electric machines functioning as both motor and generators and configured to operate at different speed and independent of each other, the hollow shaft (107) and solid shaft (105) are coupled by a second coupling unit (108) to provide combined power generated by machine 1 and machine 2 to Load 2, and configured for selectively decoupling Load 1 by the first coupling unit (106).

It is another aspect of the present invention to provide a powertrain for an agricultural tractor, comprising:

power source (113), for providing a rotational power;

an input shaft coupled to the power source (113) for receiving the rotational power;

two or more output drive shafts (105, 107) coupled to two or more loads comprising a first load (101), a second load (103), a third load (104), a prime mover or an IC engine;

a controller, and two of more coupling units (106, 108, 110), wherein the powertrain comprises a single power source (113) connected to multiple loads (101,103,104), by the first solid shaft (105) connecting machine 1 to a load 1 (101) on one end through a coupling device (106) and to a prime mover (109) on the front end through a coupling unit (110), a second hollow shaft (107) connecting machine 2 to the load 2, the machines are electric machines functioning as both motor and generators and configured to operate at different speed and independent of each other, the hollow shaft (107) and solid shaft (105) are coupled by a second coupling unit (108) to provide combined power generated from both machine 1 and machine 2 to Load 2, by selectively decoupling Load 1 by the first coupling unit (106), the prime mover or engine is connected to machine 1 front end shaft, and either acts as a generator to charge the power source, after decoupling the Loads (101, 103, 104) and also configured to provide additional power to the machine 1 and machine 2 to provide energy to load 2 in case of high power requirement.

It is yet another aspect of the present invention to provide a powertrain for an agricultural tractor, wherein the power source is an energy storage system selected from electro-chemical, mechanical, or Pneumatic systems.

It is yet another aspect of the present invention to provide a powertrain for an agricultural tractor, wherein the coupling units are selected from mechanical, electro-mechanical or pneumatic systems.

It is another aspect of the present invention to provide a powertrain for an agricultural tractor, wherein the loads are selected from any type of drive train or gear train system.

It is another aspect of the present invention to provide a powertrain for an agricultural tractor, wherein load 1 (101) is selected from Vehicle Traction wheels, with/without any implements like Haulage, cultivator, rotary tiller, mower, sprayer and the like.

It is another aspect of the present invention to provide a powertrain for an agricultural tractor, wherein load 2 (103) is selected from Vehicle PTO or Hydraulic pump drive, HVAC unit/Any implements like cultivator, rotary tiller, mower, sprayer and the like.

It is another aspect of the present invention to provide a powertrain for an agricultural tractor, wherein load 3 (104) is selected from Vehicle PTO or Blowers, Brushes/Any implements like cultivator, rotary tiller, mower, sprayer and the like.

It is another aspect of the present invention to provide a powertrain for an agricultural tractor, wherein the power source (113) is Lead acid/Li-ion/Sodium based/solid state battery or Hydrogen power cell.

REFERENCE NUMERALS

Figure 1:
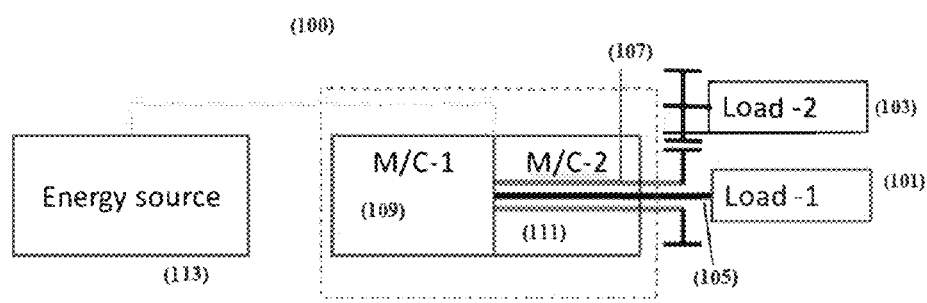
FIG. 1: depicts the system configuration of the first embodiment of the present invention.

Reference numerals for the system configuration for various embodiments of the Powertrain for an agricultural tractor according to various embodiments of the present invention.

101—Load 1
101R—Load 1 on Right side
101L—Load 1 on Left hand side.
103—Load 2
104—Load 3
105—Solid Shaft
106—Unit A
107—Hollow Shaft
108—Unit B
109—Machine 1
110—Unit C
111—Machine 2

113—Energy Source
115—Prime Mover/IC Engine
120—Vehicle Control Unit (VCU)
121—Machine 1 Control unit.
122—Machine 2 Control Unit.

DETAILED DESCRIPTION OF THE INVENTION

The present invention as embodied by an "A Powertrain for an Agricultural Tractor with Dual Drive and Dual Independent Output Electrical Machine" succinctly fulfills the above-mentioned need[s] in the art. The present invention has objective[s] arising as a result of the above-mentioned need[s], said objective[s] being enumerated below. In as much as the objective[s] of the present invention are enumerated, it will be obvious to a person skilled in the art that, the enumerated objective[s] are not exhaustive of the present invention in its entirety and are enclosed solely for the purpose of illustration. Further, the present invention encloses within its scope and purview, any structural alternative[s] and/or any functional equivalent[s] even though, such structural alternative[s] and/or any functional equivalent[s] are not mentioned explicitly herein or elsewhere, in the present disclosure. The present invention therefore encompasses also, any improvisation[s]/modification[s] applied to the structural alternative[s]/functional alternative[s] within its scope and purview. The present invention may be embodied in other specific form[s] without departing from the essential attributes thereof.

Throughout this specification, the use of the word "comprises" and variations such as "comprises" and "comprising" may imply the inclusion of an element or elements not specifically recited.

Definitions:
M/C—All type of Electric Machine. In various embodiments the machines are selected from electric motor or generator.
Energy Source: Lead acid/Li-ion/Sodium based/solid state battery or Hydrogen power cell.
Load—Through any type of drive train/gear train system. Here Load is any additional agricultural implement that is coupled either directly to the solid or the hollow shafts or is coupled by any mechanical/electro-mechanical/hydraulic link.
Energy source—Any energy storage system (Electrochemical, Mechanical or Pneumatic system)
Unit-A—Any Mechanical/Electro-mechanical/Hydraulic link
Unit-B—Any Mechanical/Electro-mechanical/Hydraulic link
Unit-C—Any Mechanical/Electro-mechanical/Hydraulic link
Shafts: Hollow shaft and Solid shafts.

The present invention discloses a powertrain comprising a drive arrangement and engine, which is configured and is suitable for a tractor. In particular, the powertrain of the present invention comprises a Dual Drive with Dual Independent Output Electrical Machine and serves for driving the tractor and for transmitting energy to at least one attachment unit or implement which is couplable and is coupled to the tractor. Present invention addresses the issues of packaging compactly such that the tractor can work for prolonged duration and has a constant power supply. Further, the objective is to provide additional power or combined power in case of implements, herein termed as Loads, which require high power to operate. The present invention provides more than one machine which are selected from any or all type of Electric machines (M/C).

Powertrain of the present invention serves for transmitting energy to consumers of the tractor and/or the at least one attachment unit. The powertrain comprises a power take-off, in particular a power take-off shaft, which is configured and is suitable for driving the attachment unit which is couplable to the tractor. The attachment herein is synonymous with the Load (101, 102, 103, 104) In particular, the power take-off forms a mechanical drive source for the attachment unit. The power take-off may be selectively arranged on the front side or rear side of the tractor. The attachment unit or the Load, may be an attachment unit which is towed or carried by the tractor, or which is stationary, and which is able to be driven or is driven at the same time via the power take-off.

The vehicle transmission has at least one, or exactly one, transmission output which is formed and/or is suitable for driving at least one, or exactly one, vehicle axle. In particular, the vehicle axle is a driven rear axle or alternatively a driven front axle of the tractor.

The drive arrangement comprises one or more electric machines. In particular, the two electric machines (M/C) (109, 111) are configured in each case as a rotating electric machine. Preferably, the two electric machines have in each case a motor shaft, via which the two electric machines are mechanically integrated in the drive arrangement.

Present invention in various embodiments discloses a powertrain for an agricultural tractor (100), with dual drive and dual independent electrical output. The powertrain comprises a power source (113), for providing a rotational power, an input shaft coupled to the power source for receiving the rotational power, two or more output drive shafts (105, 107) coupled to two or more loads. Here, loads are any type of implements configured to be coupled to the tractor.

The present invention comprises a vehicle control unit (VCU-120), which is a master control unit. Each of the machines and the battery have their control units, and all these control units are integrated to the VCU. The user input at the steering unit is operated by the user, and depending on the user input a decision is made by the VCU for activation of load 1 (101), load 2 (102), load 3 (103) or load 4 or prime mover (115). The VCU (120) collects the information from other various control units and activates the energy source (113) to supply energy to the respective selected load (i.e. load 1 or load 2 or load 3).

In the first embodiment is provided a first load (101) and a second load (103), a controller. The powertrain connects to multiple loads (101, 103) through a single energy source, by the first shaft, a solid shaft (105) connecting machine 1 to the load 1, and a second hollow shaft (107) connecting machine 2 to the load 2, the machines are electric machines functioning as both motor and generators and configured to operate at different speed and independent of each other and load 1 and load 2 are configured to be operated independently by the drive shafts.

Example 1

The first embodiment is exemplified by an energy source (113) selected from a battery. This battery is connected to a control unit, and further to a VCU or Vehicle control unit i.e. master unit. If the user wants to activate load 1 or load 2, the VCU collects the information from other various control units and activates the energy source to supply energy to the respective selected load (i.e. load 1 or load 2). The powertrain connects to multiple loads, Load 1 is selected from Vehicle Traction wheels, with/without any implements like Haulage, cultivator, rotary tiller, mower, sprayer etc. Load 2 is selected from Vehicle PTO or Hydraulic pump drive, HVAC unit/any implements like cultivator, rotary tiller, mower, sprayer etc. The powertrain is configured such that the solid shaft (105) connects machine 1 (M/C-1 109) to Load 1 (101). Machine 2 (M/C-2—111) is connected via hollow shaft (107) to Load 2, Here the energy from the battery (113) is electrical energy sent to the M/C-1 (109) and M/C-2 (111), that converts electrical energy into mechanical energy and transfers to Load 1 and Load 2. Both are operated independently along with machine 1 and 2. Here two machines are integrated, and two different loads are operating simultaneously.

Figure 2:
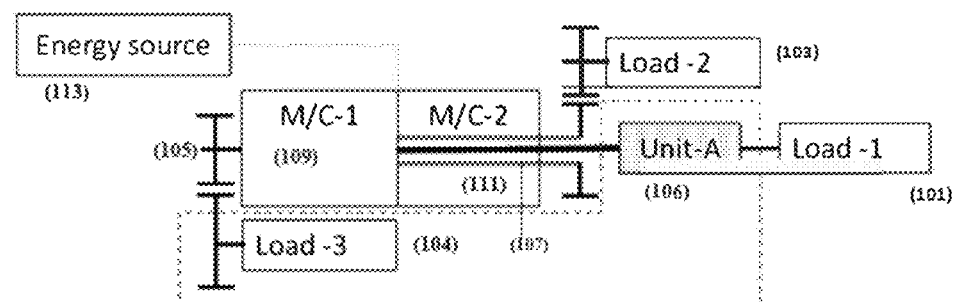
FIG. 2: depicts the system configuration of the second embodiment of the present invention.

In reference to FIG. 2, is disclosed a second embodiment of the present invention comprising a first load (101) and a second load (103), and a controller. The powertrain connects to multiple loads (101,103) through a single energy source (113), by the first solid shaft (105) connecting machine 1 to a load 3 (104) on one end and through a coupling device (106) on another end to a load 1, the solid shaft configured to pass through the front and the rear end of machine 1. The powertrain further comprises a second hollow shaft (107) connecting machine 2 (111) to the load 2, the machines are electric machines functioning as both motor and generators and configured to operate at different speed and independent of each other, load 3 is connected to the machine 1, and load 2 is connected to machine 2. Load 1 is detachably coupled via coupling unit A (106). Machine 1 configured to run load 1 and 3 simultaneously and load 2 is configured to be operated independently by the drive shafts. In this configuration a machine 1 runs two loads (101, and 103) and machine 2 runs Load 2, independently.

The key inventive aspect lies in the configuration wherein in a use case where the Load 3 requires more power than machine 1 can be dedicatedly used to provide power only to Load 3, this is achieved by decoupling the Load 1 so that all the power generated by Machine 1 is used for running Load 3. Load 3 is run by a set of stator and rotor. Machine 1 is run by a first set of controller, stator and rotor and Machine 2 is run by a second set of controller, stator, and rotor. Unit A is mechanical or hydraulic coupling or electromechanical coupling which will connect with load 1 or disconnect with Load 1. Load 2 and Load 3 are always connected, and Load 1 is connected or disconnected as per requirement. Machine 1 load 3 (104), always connected whereas Load 1 (101) is coupled.

Example 2

The second embodiment is exemplified by an energy source (113) selected from a battery. This battery is connected to a control unit, which is connected to a VCU or Vehicle control unit (120). The powertrain connects to multiple loads (101,103) through a single energy source (113), by the first solid shaft (105) connecting machine 1 to a load 3 (104) on one end and through a coupling device (106) on another end to a load 1 by a solid shaft (105). The solid shaft (105) configured to pass through the front and the rear end of machine 1 (109), that connects and runs Load 1 (101) and Load 3 (104). The powertrain further comprises a second hollow shaft (107) connecting machine 2 (111) to the load 2 (103), the machines are electric machines functioning as both motor and generators and configured to operate at different speed and independent of each other. Load 1 (101) is detachably coupled via coupling unit A (106). Machine 1 (109) configured to run load 1 (101) and load 3 (104) simultaneously and load 2 (103) are configured to be operated independently by the drive shafts.

Here the energy from the battery is electrical energy sent to the M/C-1 (109) and M/C-2 (111), that converts electrical energy into mechanical energy and transfers to Load 1 and Load 2. Both are operated independently along with machine 1 and 2.

Load-1: Vehicle Traction wheels, with/without any implements like Haulage, cultivator, rotary tiller, mower, sprayer and the like.

Load-2: Vehicle PTO or Hydraulic pump drive, HVAC unit/Any implements like cultivator, rotary tiller, mower, sprayer and the like.

Load-3: Vehicle PTO or Blowers, Brushes/Any implements like cultivator, rotary tiller, mower, sprayer and the like.

Machine 1 may for e.g. be connected to vehicle traction wheels alone or coupled to implements like Haulage or rotary tiller, mower, sprayer and the like, which form Load 1. Machine 2 is connected by hollow shaft to vehicle PTO/Hydraulic pump drive, HVAC unit or any implements like cultivator, rotary tiller, mower, sprayer. Load 3 is attached to machine 1 and is vehicle PTO or blower, brushes or implements like cultivator, rotary tiller, mower, sprayer. Here, the power train in this embodiment runs Load 3 and Load 2 at all times, and configured to run Load-1 which is selected from vehicle Traction wheels, with/without any implements like Haulage, cultivator, rotary tiller, mower, sprayer, which can be decoupled when Load 2 or Load 3 demand increase power supply from the battery.

Figure 3:
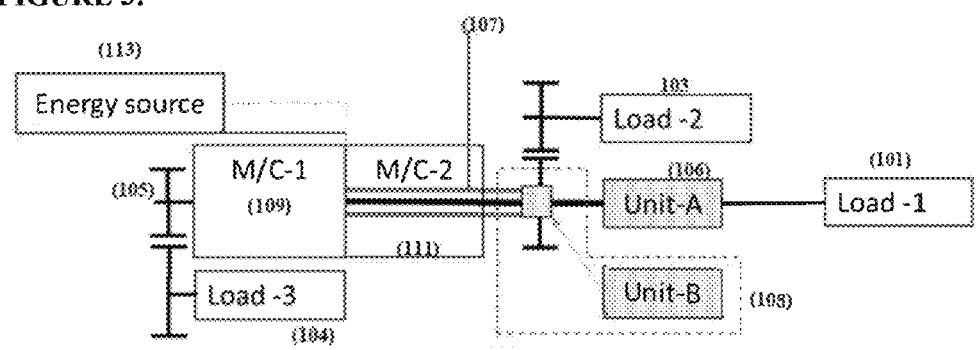
FIG. 3: depicts the system configuration of the third embodiment of the present invention.
Figure 4:
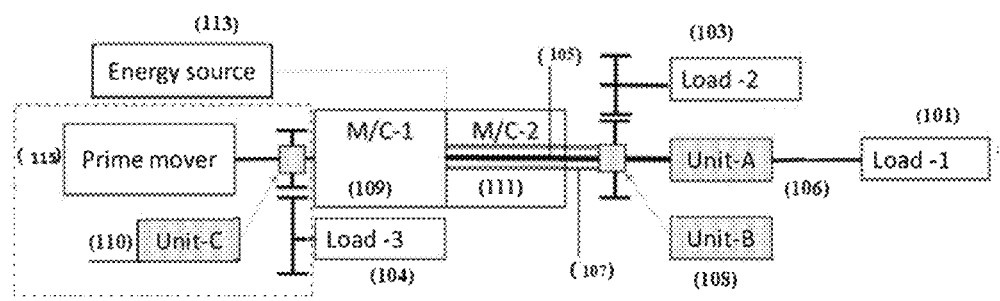
FIG. 4: depicts the system configuration of the fourth embodiment of the Powertrain for a tractor.

In reference to FIG. 3, a third embodiment of the present invention discloses a power train comprises a power source (113), for providing rotational power. A drive arrangement comprising an input shaft coupled to the power source (113) for receiving the rotational power. It further comprises two or more output drive shafts (105, 107) coupled to two or more loads. A first load (101), a second load (103), a third load (104). The third embodiment has two coupling units referred to as Unit A (106), and Unit B (108). The unit-B (108) is a locking mechanism provided to combine the Machine-1 & Machine-2 power outputs. The powers of machine 1 and machine 2 combined Power outputs can take care all the mentioned loads. (Load—1, 2 & 3). In the third embodiment the unit B couples solid shaft (105) and hollow shaft (107). It further comprises a controller. The powertrain comprises a single power source (113) connected to multiple loads (101,103,104) by the first solid shaft (105) connecting machine 1 to a load 3 (104) on one end and through a unit-A, coupling device (106) on another end to a load 1 (101), a second hollow shaft connecting machine 2 (111) to the load 2 (103), the machines are electric machines functioning as both motor and generators and configured to operate at different speed and independent of each other, the hollow shaft (107) and solid shaft (105) are coupled by a second coupling unit/locking mechanism (108) to provide combined power generated by machine 1 and machine 2 to Load 2, and configured for selectively decoupling Load 1 by the first coupling unit (106). In this embodiment wherein the Load 2 requires high power in such cases the power generated by machine 1 and machine 2 are coupled and powered to Load 2, simultaneously decoupling of the Load 1 to reduce the load on the machine 1 such that the Load 2 (103) is run efficiently.

Working Example

Example 3

In reference to FIG. 3, a third embodiment of the present invention discloses a power train comprising a power source (113), in exemplary embodiment the power source is a battery. The drive arrangement comprises an input shaft coupled to the power source (113) for receiving the rotational power. It further comprises two or more output drive shafts (105, 107) coupled to at least three loads, a first load (101), a second load (103), a third load (104). It comprises two coupling units referred to as unit A (106), and unit B (108). The unit-B is a locking mechanism provided to combine the Machine-1 & Machine-2 power outputs.

Unit B is a locking mechanism to combine the powers of machine 1 and machine 2 combined Power outputs can take care all the mentioned loads (Load—1, 2 & 3). The unit B couples solid shaft (105) and hollow shaft (107). It further comprises a controller. The power source (113) is a battery connected to machines M/C-1 and M/C-2, which are connected to loads. The first solid shaft (105) connects machine 1 to a load 3 (104) on one end, selected from vehicle PTO or Blowers, Brushes/any implements like cultivator, rotary tiller, mower, sprayer.

The solid shaft through a coupling device (106) on the other end is connected to load 1 (101), wherein the load 1 is selected from Vehicle Traction wheels alone with/without any implements like Haulage, cultivator, rotary tiller, mower, sprayer.

A second hollow shaft connecting machine 2 to the load 2 (103), the machines are electric machines functioning as both motor and generators and configured to operate at different speed and independent of each other, the hollow shaft (107) and solid shaft (105) are coupled by a second coupling unit/locking mechanism (108) to provide combined power generated by machine 1 and machine 2 to Load 2, and configured for selectively decoupling Load 1 by the first coupling unit (106). When Load 2 requires high power in such cases the power generated by machine 1 and machine 2 are coupled and powered to Load 2, for example may include a HVAC unit or a rotary tiller. Simultaneously decoupling of the Load 1 to reduce the load on the machine 1 such that the Load 2 (103) is run efficiently.

In a fourth embodiment is provided a power train that comprises an internal combustion engine, in particular a diesel engine. The internal combustion engine also termed as prime mover (109) is operatively connected to one of the two electric machines, wherein the corresponding electric machine is able to be operated in a generator mode for generating electrical energy. power source (113), for providing a rotational power. The powertrain comprises an input shaft coupled to the power source (113) for receiving the rotational power, two or more output drive shafts (105, 107) coupled to two or more loads comprising a first load (101), a second load (103), a third load (104), a prime mover or an IC engine, a controller, two or more coupling units (106, 108, 110). A coupling unit A that is configured to detachably attach Load 1 (101) to the machine 1 (109). Coupling unit C (110) detachably attached to the prime mover (109). The powertrain comprises a single power source (113) connected to multiple loads (101,103,104), by the first solid shaft (105) connecting machine 1 to a load 1 (101) on one end through a coupling device (106) and to a prime mover (109) on the front end through a coupling unit (110), a second hollow shaft (107) connecting machine 2 to the load 2, the machines are electric machines functioning as both motor and generators and configured to operate at different speed and independent of each other, the hollow shaft (107) and solid shaft (105) are coupled by a second coupling unit (108) to provide combined power generated from both machine 1 and machine 2 to Load 2, by selectively decoupling Load 1 by the first coupling unit (106), the prime mover or engine is connected to machine 1 front end shaft, and either acts as a generator to charge the power source (113), after decoupling the Loads (101, 103, 104) and also configured to provide additional power to the machine 1 and machine 2 to provide energy to load 2 in case of high power requirement.

The prime mover (115) in a first use case, will be connected to the machine 1 (109) which will act as a generator and charge the energy source (113), through machine 1.

In a second use case, the prime mover (115), all the loads load 1 (101), load 2 (103) and load 3 (104) are engaged and the power generated by machine 1 machine 2 is not sufficient, then prime mover is enabled to provide via unit C, additional power. Prime mover 115, Machine 1 and machine 2 give mechanical output. If this is insufficient to run all the loads, the prime mover (115) will provide the additional energy to run the loads. The prime mover (115) can in specific use cases be used as generator, to charge the energy source (113). Load 2 and Load 3 can be disconnected, and the prime mover (115) can be used to recharge the energy source.

Example 4

In a fourth embodiment is provided a power train that comprises an internal combustion engine, in particular a diesel engine. The internal combustion engine also termed as prime mover (109) is operatively connected to one of the two electric machines, wherein the corresponding electric machine is able to be operated in a generator mode for generating electrical energy. The power source (113), for providing a rotational power. The powertrain comprises an input shaft coupled to the power source (113) for receiving the rotational power, two or more output drive shafts (105, 107) coupled to two or more loads comprising a first load (101R, 101L), a second load (103), a third load (104), a prime mover or an IC engine, a controller, two of more coupling units (106, 108, 110). There are multiple control units, control unit of the battery (113). A first control unit (121) for machine 1 (109), a second control unit (122) for machine 2 (112).

Load-1: The solid shaft (105) connects on the right hand side a Load 1 (101R) Vehicle Traction wheels, with/without any implements like Haulage, cultivator, rotary tiller, mower, sprayer etc etc. The hollow shaft connects Load-2 via Unit B (108). In this embodiment the Load 2 requires high power which is provide by combining the power of machine 1 (M/C-1 109) and machine-2 (M/C-2) (111).

Load-2: Vehicle PTO or Hydraulic pump drive, HVAC unit/Any implements like cultivator, rotary tiller, mower, sprayer and the like.

Load-3: Vehicle PTO or Blowers, Brushes/Any implements like cultivator, rotary tiller, mower, sprayer and the like.

Energy source: Lead acid/Li-ion/Sodium based/solid state battery or Hydrogen power cell.

Figure 5:
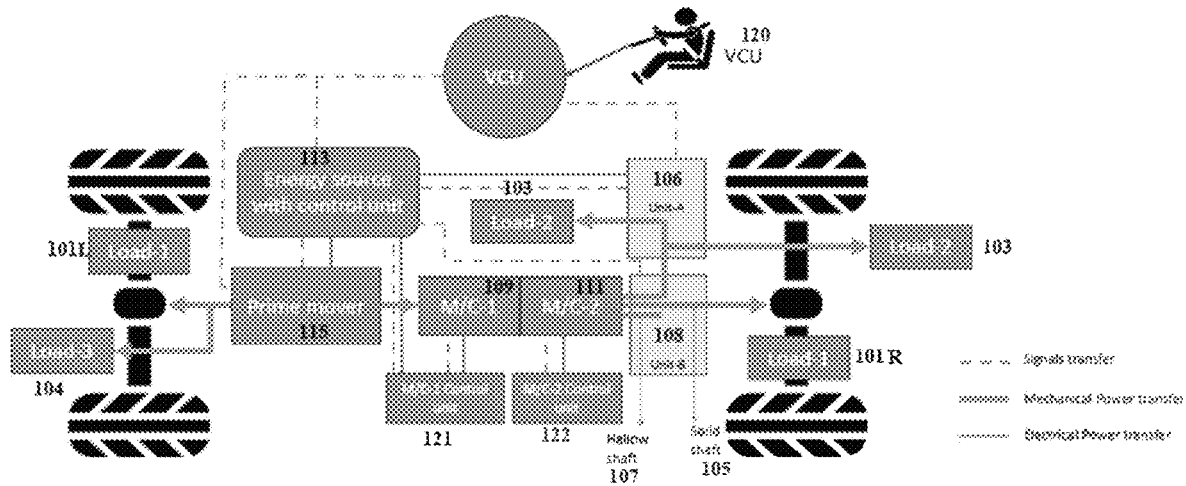
FIG. 5: depicts the use case for example 4, according to the fourth embodiment of the present invention.

Reference is drawn to FIG. 5, the prime mover converts electrical energy from the battery to mechanical energy and supplies it to Load 1 (101L) on left hand side and Load 3 (104). The battery is also configured to send the electrical energy to machine 1 and machine 2, control units which supply the same to the machine 1 and 2. This energy is converted by the machine 1 and machine 2 to load 2 via, the coupling unit B (108).

A coupling unit A that is configured to detachably attach Load 1 (101) to the machine 1 (109). Coupling unit C (110) detachably attached to the prime mover (109). The powertrain comprises a single power source (113) connected to multiple loads (101,103,104), by the first solid shaft (105) connecting machine 1 to a load 1 (101) on one end through a coupling device (106) and to a prime mover (109) on the front end through a coupling unit (110), a second hollow shaft (107) connecting machine 2 to the load 2 (103), the machines are electric machines functioning as both motor and generators and configured to operate at different speed and independent of each other, the hollow shaft (107) and solid shaft (105) are coupled by a second coupling unit (108) to provide combined power generated from both machine 1 and machine 2 to Load 2, by selectively decoupling Load 1 by the first coupling unit (106), the prime mover or engine is connected to machine 1 front end shaft, and either acts as a generator to charge the power source, after decoupling the Loads (101, 103, 104) and also configured to provide additional power to the machine 1 and machine 2 to provide energy to load 2 in case of high power requirement.

We claim:

1. A powertrain for an agricultural tractor, comprising:
a power source, for providing a rotational power;
an input shaft coupled to the power source for receiving the rotational power;
two or more output drive shafts coupled to two or more loads selected from a first load and a second load, and
a controller,
wherein the powertrain connects to multiple loads through the power source, by a first solid drive shaft connecting a first machine to the first load, and a second hollow shaft connecting a second machine to the second load, the machines are electric machines functioning as both motor and generators and configured to operate at different speed and independent of each other and the first load and the second load are configured to be operated independently by the drive shafts.

2. The powertrain for an agricultural tractor according to claim 1, wherein the first load is selected from a vehicle traction wheels, with/without any implements.

3. The powertrain for an agricultural tractor according to claim 1, wherein the second load is selected from a vehicle PTO or hydraulic pump drive, HVAC unit or any implements.

4. The powertrain for an agricultural tractor of claim 1, the power source is a lead acid, li-ion, sodium based, solid state battery or hydrogen power cell.

5. A powertrain for an agricultural tractor according to claim 1, wherein the coupling units are selected from mechanical, electro-mechanical or pneumatic systems and the loads are selected from any type of drive train or gear train system.

6. A powertrain for an agricultural tractor, comprising:
a power source, for providing a rotational power;
an input shaft coupled to the power source for receiving the rotational power;
two or more output drive shafts coupled to two or more loads, selected from a first two or more machines comprising a first machine, a second machine; and
a controller,
wherein the powertrain connects to multiple loads through the power source, by a first solid drive shaft connecting the first machine to a third load on one end and through a coupling device on another end to a first load, the solid shaft configured to pass through the front and the rear end of the first machine,
a second hollow shaft connecting the second machine to the second load, the machines are electric machines functioning as both motor and generators and configured to operate at different speed and independent of each other, wherein the third load and the second load are connected, wherein the first load is detachable, wherein the first machine is configured to run the first load and third load simultaneously, and the second load is configured to be operated independently by the drive shafts and second machine.

7. The powertrain for an agricultural tractor as claimed in claim 6, wherein the third load is selected from vehicle PTO, blowers, brushes or any implements.

8. The powertrain for an agricultural tractor according to claim 6, wherein the first load is selected from a vehicle traction wheels, with/without any implements.

9. The powertrain for an agricultural tractor according to claim 6, wherein the second load is selected from a vehicle PTO or hydraulic pump drive, HVAC unit or any implements.

10. The powertrain for an agricultural tractor as claimed in claim 6, wherein the third load is selected from vehicle PTO, blowers, brushes or any implements.

11. The powertrain for an agricultural tractor of claim 6, wherein the power source is a lead acid, Li-ion, sodium based, solid state battery or hydrogen power cell.

12. A powertrain for an agricultural tractor according to claim 6, wherein the coupling units are selected from mechanical, electro-mechanical or pneumatic systems and the loads are the loads are selected from any type of drive train or gear train system.

13. A powertrain for an agricultural tractor, comprising
a power source, for providing a rotational power;
an input shaft coupled to the power source for receiving the rotational power;
two or more output drive shafts coupled to two or more loads comprising a first load, a second load, a third load, and a controller,
wherein the powertrain comprises the power source connected to multiple loads, by a first solid drive shaft connecting a first machine to a third load on one end and through a coupling device on another end to a first load, a second hollow shaft connecting a second machine to the second load, the machines are electric machines functioning as both motor and generators and configured to operate at different speed and independent of each other, the hollow shaft and solid shaft are coupled by a second coupling unit to provide combined power generated by the first machine and the second machine to the second load, and configured for selectively decoupling the first load by the first coupling unit.

14. The powertrain for an agricultural tractor of claim 13, wherein the power source is a lead acid, Li-ion, sodium based, solid state battery or hydrogen power cell.

15. A powertrain for an agricultural tractor according to claim 13, wherein the coupling units are selected from mechanical, electro-mechanical or pneumatic systems and the loads are the loads are selected from any type of drive train or gear train system.

16. A powertrain for an agricultural tractor according to claim 13, wherein the first load is selected from a vehicle traction wheels, with/without any implements.

17. The powertrain for an agricultural tractor according to claim 13, wherein the second load is selected from a vehicle PTO or hydraulic pump drive, HVAC unit or any implements.

18. The powertrain for an agricultural tractor as claimed in claim 13, wherein the third load is selected from vehicle PTO, blowers, brushes or any implements.

19. A powertrain for an agricultural tractor, comprising
a power source, for providing a rotational power;
an input shaft coupled to the power source for receiving the rotational power;
two or more output drive shafts coupled to two or more loads comprising a first load, a second load, a third load,
a prime mover or an IC engine;
a controller,
two of more coupling units;
wherein the powertrain comprises the power source connected to multiple loads, by a first solid drive shaft connecting to a first machine to the first load on one end through a coupling device and a prime mover on the front end through a coupling unit, a second hollow shaft connecting a second machine to the second load, the machines are electric machines functioning as both motor and generators and configured to operate at different speed and independent of each other, the hollow shaft and solid shaft are coupled by a second coupling unit to provide combined power generated from both the first machine and the second machine to a second load, by selectively decoupling the first load by the first coupling unit, the prime mover or engine is connected to the first machine front end shaft, and either acts as a generator to charge the power source, after decoupling the loads and also configured to provide additional power to the first machine and the second machine to provide energy to the second load in case of high power requirement.

20. A powertrain for an agricultural tractor according to claim 19, wherein the coupling units are selected from mechanical, electro-mechanical or pneumatic systems and the loads are selected from any type of drive train or gear train system.

21. The powertrain for an agricultural tractor of claim 19, wherein the power source is a lead acid, Li-ion, sodium based, solid state battery or hydrogen power cell.

22. The powertrain for an agricultural tractor according to claim 19, wherein the first load is selected from a vehicle traction wheels, with/without any implements.

23. The powertrain for an agricultural tractor according to claim 19, wherein the second load is selected from a vehicle PTO or hydraulic pump drive, HVAC unit or any implements.

24. The powertrain for an agricultural tractor as claimed in claim 19, wherein the third load is selected from vehicle PTO, blowers, brushes or any implements.

25. The powertrain for an agricultural tractor as claimed in claim 19, wherein the prime mover is configured to charge the energy source on disconnecting the second load and third load.

26. The powertrain for an agricultural tractor as claimed in claim 19, wherein the power source is connected to a control unit, and further to a VCU or Vehicle control unit, configured to be operated by the user to activate the selected load, the VCU collects the information from other various control units and activates the energy source to supply energy to the respective selected load from first load, second load or third load.

27. The powertrain for an agricultural tractor as claimed in claim 19, wherein the power source is configured to send the electrical energy to the first machine and second machine, sends combined power from the first and second machine to second load via a coupling unit B and wherein the prime mover converts electrical energy from the energy source to mechanical energy and supplies it to first load on left hand side and the third load.

* * * * *